United States Patent [19]

Cunningham

[11] 4,034,333

[45] July 5, 1977

[54] METHOD OF REDUCING MONOCHROMATIC INTERFERENCE IN CONTINUOUS WAVE SEISMIC PROSPECTING

[75] Inventor: Allen B. Cunningham, Houston, Tex.

[73] Assignee: Exxon Production Research Company, Houston, Tex.

[22] Filed: Sept. 29, 1975

[21] Appl. No.: 617,762

[52] U.S. Cl. .................. 340/15.5 TA; 340/15.5 F; 235/181

[51] Int. Cl.$^2$ ..................... G01V 1/02; G01V 1/36

[58] Field of Search ............... 340/15.5 TA, 15.5 F; 235/181

[56] References Cited

UNITED STATES PATENTS

| 3,221,298 | 11/1965 | Burns | 340/15.5 TA |
| 3,289,154 | 11/1966 | Cunningham | 340/15.5 TA |
| 3,307,648 | 3/1967 | Masterson | 340/15.5 TA |
| 3,638,175 | 1/1972 | Stone | 340/15.5 F |
| 3,757,235 | 9/1973 | McCormick et al. | 340/15.5 F |
| 3,889,229 | 6/1975 | Kostelnicek et al. | 340/15.5 F |
| 3,895,343 | 7/1975 | Farr | 340/15.5 TA |

*Primary Examiner*—Howard A. Birmiel
*Attorney, Agent, or Firm*—E. Eugene Thigpen

[57] ABSTRACT

A monochromatic interference signal is removed from seismic data records by transmitting into the earth a seismic signal having a null component in its power spectrum at substantially the frequency of the interference signal. When cross-correlation techniques are used to determine subsurface characteristics, the cross-correlation product of the detected signal with the transmitted signal will contain a substantially zero component at the frequency of the interference signal.

26 Claims, 5 Drawing Figures

METHOD OF REDUCING MONOCHROMATIC INTERFERENCE IN CONTINUOUS WAVE SEISMIC PROSPECTING

BACKGROUND OF THE INVENTION

1. Field of the Invention

The present invention relates to seismic prospecting. More particularly, it relates to a system for reducing the effects of a monochromatic interference signal on seismic data records.

2. Description of the Prior Art

Certain monochromatic interference signals have always been a problem in seismic prospecting. In the United States, the most prevalent signal of this type is caused by 60 cycles per second power distribution systems. In the past, this interference signal has been removed from seismic records by various filtering techniques including filters incorporated into field systems and computer programs that remove the interference signal during data processing.

A disadvantage of previously used filtering techniques is that either additional hardware must be incorporated into the seismic field equipment or additional computer programming must be used during seismic data processing.

Another disadvantage of most filters is that they cause distortion in seismic data signals at frequencies near the interference signal frequency. The filters that have been developed for removing a monochromatic interference signal without distorting the data signal at nearby frequencies subtract from the data signal a fixed nulling signal. The nulling signal frequency, phase, and amplitude characteristics are adjusted to match the interference signal, either manually (see U.S. Pat. No. 2,733,412, Alexander et al, issued Jan. 31, 1956) or by feedback loops (see U.S. Pat. Nos. 3,757,235, McCormack et al, issued Sept. 4, 1973, and 3,889,229, Kostelnicek et al, issued June 10, 1975). Both the manually adjusted systems and the feedback systems, however, require the use of additional complex hardware, and the manually adjusted systems are time consuming for the field personnel to operate. Furthermore, to avoid distorting nearby frequencies, the nulling signal must not be varied during the recording of the seismic signal. And if the interference signal characteristics change slightly after the nulling signal is fixed, cancellation of the interference signal may be inadequate.

SUMMARY OF THE INVENTION

This invention is a system for reducing the effect on seismic data records of a monochromatic interference signal present in the area in which seismic prospecting is conducted.

A continuous wave of seismic energy is transmitted into the earth. Reflected seismic energy from subsurface reflecting interfaces is detected by geophones or other seismic detectors, and travel time of the seismic wave is determined by cross-correlating the detected signal with the transmitted signal.

To reduce the effects of the monochromatic interference signal on the signal resulting from the cross-correlation, a seismic signal having a null component in the power spectrum thereof is transmitted into the earth. A signal pattern is selected such that the frequency of the interference signal is closer to the frequency of the null component than to either of the two components in said power spectrum adjacent said null component.

In a preferred embodiment of the invention, a signal pattern corresponding to a binary coded sine wave is transmitted. To accurately map the subsurface structure, the pattern is nonrepetitive for at least as long as the longest travel time of the seismic wave from the transmitting location to the detecting location. A signal pattern that is particularly useful is the binary coded sine wave of maximal length, in which any sequence of $n$ bits does not repeat during any sequence of $2^n - 1$ bit intervals.

An advantage of this system is that it avoids the distortion in seismic data at frequencies near the interference frequency caused by most previously used systems for removing the monochromatic interference signal.

Another advantage is that it reduces the amount of hardware needed to remove the interference signal during field operations while eliminating the need to use special computer programming to remove the interference signal during seismic data processing.

DESCRIPTION OF THE PREFERRED EMBODIMENT

In continuous wave seismic prospecting, a signal which is nonrepetitive for at least as long as the longest travel time from the transmitting location to the detecting location is transmitted into the earth. Reflected signals from subsurface interfaces are detected at the surface by geophones or other seismic detectors, and travel time from the surface to reflecting interfaces and back to the surface is determined by cross-correlating the transmitted signal with the detected signal.

Figure 1:
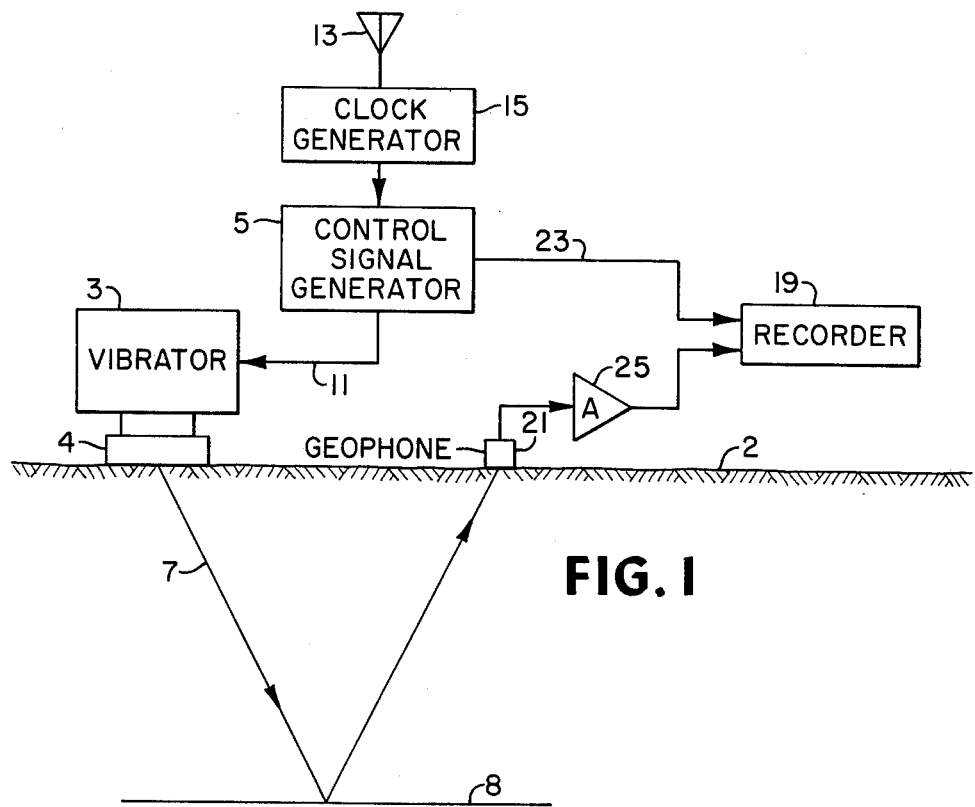
FIG. 1 illustrates apparatus useful in practicing the invention.

Apparatus useful in practicing this invention is illustrated in FIG. 1. A vibrator 3 is positioned on the earth's surface 2 at a transmitting location. The vibrator may preferably be an electrohydraulic vibrator such as described in U.S. Pat. No. 3,363,720 or the Texas Instruments X-2 Model. Such vibrators normally utilize an earth coupling plate 4 that is reciprocably driven by a piston and cylinder assembly. An electrohydraulic servovalve controls the relative motion between the piston and cylinder in response to an electrical input control signal.

A geophone 21 is shown positioned at a detecting location. Although a single geophone is shown for simplicity, a plurality of interconnected geophones are typically used at a detecting location. Normally, a plurality of detecting locations are used which may be located at spaced-apart positions on either or both sides of the vibrator. Seismic waves travel downwardly into the earth along a variety of ray paths, such as ray path 7, and a portion of the seismic energy is reflected from subsurface interfaces, such as interface 8, upwardly to the detecting locations.

A control signal generator 5 generates the electrical input control signal for the vibrator. This control signal is shown coupled to the vibrator by electrical leads 11. This control signal, which will be further discussed hereinafter, will have a bit period related to the period of the monochromatic interference signal present in the area where seismic exploration is conducted. The interference signal may be detected by antenna 13 which is shown coupled to the control signal generator through clock generator 15. Clock generator 15 includes means for filtering the signal detected by antenna 13 to remove signals other than the interference signal and for generating a stable reference clock at the frequency of the interference signal. This reference clock controls the bit period of the input control signal to the vibrator. The circuits of clock generator 15 may be of standard design known to those of ordinary skill in the art. The control signal generator is typically a minicomputer such as Model SPC 16/50 manufactured by General Automation. Methods of utilizing such a computer to generate the vibrator input control signal are well known to the art.

The electrical output signals from geophones are of small amplitude and normally need to be amplified prior to use in seismic analysis. Such an amplifier 25, which may be of conventional design, is shown connected to the output of detector 21. After amplification, the output signal from the detector is connected to the input of recorder 19, which may be a conventional magnetic tape recorder, adapted to record and subsequently repetitively reproduce electrical signals.

The transmitted seismic signal can be correlated with the detected signal in the field, or the seismic data can be recorded and correlated later at a data processing facility. If correlation is to be done later, the transmitted signal is also recorded. FIG. 1 shows line 23 connecting an output from control signal generator 5 to an input of recorder 19. Typically, both the transmitted and detected signals are converted to digital form prior to recording.

Figure 2:
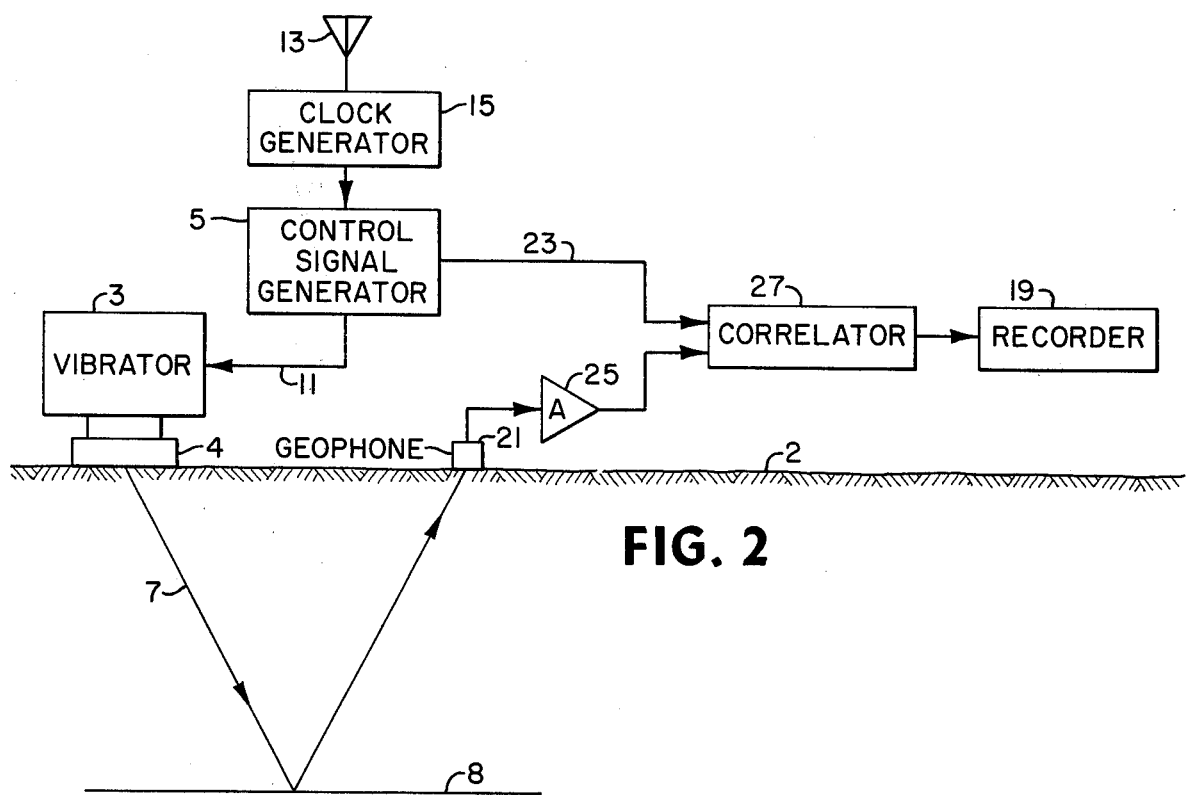
FIG. 2 illustrates a variation of the apparatus of FIG. 1, incorporating field correlation.

Alternatively, the detected seismic signal may be correlated with the transmitted seismic signal in the field as shown in FIG. 2. The apparatus illustrated in FIG. 2 is the same as that of FIG. 1 except that the output signal from the correlator is recorded rather than the transmitted and detected seismic signals. As shown in FIG. 2, the output signals from control signal generator 5 and amplifier 25 are connected to inputs of correlator 27, and the output of correlator 27 is connected to the input of recorder 19. The minicomputer used for generating the vibrator input control signal can also be programmed to perform the signal correlation. Normally the detected signal will be stored by the computer on some temporary storage means, such as a disk, until all the reflected signals from a transmission cycle have been detected before a correlation cycle is initiated.

The correlator compares the transmitted signal waveform with the detected signal waveform to determine the time required for the transmitted signal to travel from the earth's surface to various subsurface reflecting interfaces and back to the earth's surface. Correlation methods are well known to the art. A typical correlation process consists of multiplying a function of an independent variable, such as time, with a second function of the same independent variable, as the second function is shifted relative to the first function, and integrating the product over the maximum reflection time of interest.

The cross-correlation function can be represented by the integral equation:

$$\phi_{12}(\tau) = \frac{1}{T} \int_{-\frac{T}{2}}^{\frac{T}{2}} \rho_1(t) \, r_2(t + \tau) dt$$

| | | |
|---|---|---|
| $\phi_{12}(\tau)$ | = | cross-correlation of signals $r_1(t)$ and $r_2(t)$ |
| $\rho_1(t)$ | = | transmitted signal |
| $r_2(t)$ | = | detected signal |
| $t$ | = | time |
| $\tau$ | = | time displacement, or shift, between signals $\rho_1(t)$ and $r_2(t)$ |
| $T$ | = | period of signals $\rho_1(t)$ and $r_2(t)$ | in which:

If a curve is plotted of the cross-correlation function, maximum points on the curve represent values of $\tau$ at which there is optimum correlation, and may indicate the position of reflecting interfaces. Typically, the cross-correlation is generated by transforming the transmitted signal and the detected signal into frequency domain signals and multiplying the two signals, frequency component by frequency component. The inverse transform of this frequency domain signal is the desired cross-correlation signal.

The improvement in the seismic prospecting art disclosed herein is the use of a transmitted signal having a null in the power spectrum thereof substantially at the frequency of the interference signal. Interference from 60 cycles per second power lines, for example, can be eliminated by selecting a signal having a null at 60 cycles per second. The correlation signal will not have any component resulting from 60 cycles per second interference because any magnitude of 60 cycles per second interference in the detected signal when multiplied by a null in the transmitted signal will result in a zero value at that frequency.

Figure 3A:
FIGS. 3A and 3B illustrate the signal pattern of a binary code of maximal length for $n$ equal to 4.
Figure 3B:

A signal pattern that is useful in practicing this invention is a binary coded sine wave of maximal length. A binary code of maximal length has a bit pattern in which any sequence of $n$ bits does not repeat for a sequence of $2^n - 1$ bits. For example, if $n$ is chosen to be 4, any sequence of four bits will not repeat during any sequence of fifteen bits. In a binary code of maximal length having an unrepeated sequence of 15 bits, there will be 7 ONE's and 8 ZERO's or 7 ZERO's and 8 ONE's. A typical binary code for $n$ equal to 4 is shown in FIG. 3A and the corresponding sine wave is shown in FIG. 3B. The transmitted signal during a ONE bit interval is of the opposite phase from the phase of the transmitted signal during a ZERO bit interval. For a more complete discussion of binary codes of maximal length see "The Synthesis of Linear Sequential Code networks," D. A. Huffman, Proc. Third London Symposium on Information Theory, Sept. 1955; as well as U.S. Pat. No. 3,264,606, Crook et al, and 3,234,504, Wischmeyer.

Figure 4:
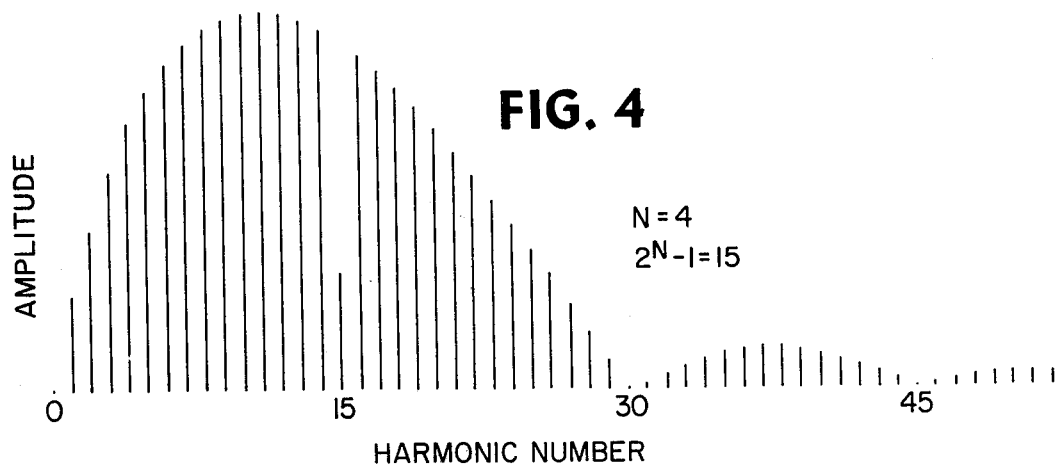
FIG. 4 illustrates the power spectrum of the signal pattern illustrated in FIG. 3B.

A binary coded sine wave of maximal length, for $n = 4$ having ONE's and ZERO's of equal amplitude is known to have the power spectrum shown in FIG. 4. The power spectrum has a fundamental frequency at the frequency at which the code is repeated, with harmonics at multiples of the fundamental frequency. The harmonics having a frequency equal to $m(2^n - 1)$ times the frequency of the fundamental, where $m$ is a whole number greater than 1, will have a null. For $m$ equal to 1, the frequency component in the power spectrum will have an amplitude substantially lower than adjacent components. By adjusting the relative amplitudes of the transmitted energy during the ONE and ZERO bit intervals so that the total energy transmitted during the ONE bit intervals is equal to the energy transmitted during the ZERO bit intervals, the frequency component for $m = 1$ is also reduced to a null.

With $n$ equal to 4 as in the example of FIG. 3, if the bit period is selected to be (1/60) sec, the fundamental frequency of the power spectrum will be 4 cycles per second, with nulls at $m(60)$ cycles per second, where $m$ is a whole number greater than 1. As explained above, by adjusting the relative amplitudes of the ONE and ZERO bits, a null is also produced at 60 cycles per second.

In order to determine the travel time of the transmitted seismic signal from the surface to subsurface reflecting interfaces and back to the surface, it is necessary that the injected pattern not repeat for a time at least as long as the travel time from the transmitting location to the maximum depth of interest and back to the detecting location. If the longest path by which the seismic wave travels from the transmitting location to the maximum depth of interest and back to the detecting location is 40,000 ft., and the average velocity of propagation of the seismic wave is 10,000 ft/sec., the signal pattern must not repeat for at least 4 seconds. For a signal having a bit period of (1/60) seconds, the code must be at least 240 bits long. For a binary code of maximal length, which has an unrepeated bit pattern of $2^n - 1$ bits, $n$ would need to be 8 or greater.

Although the binary coded sine wave of maximal length is particularly useful in practicing this invention, other codes having a power spectrum with substantially a null component at the frequency of the interference signal may be employed. Although this application discloses the use of field detection means for generating a transmitted signal pattern having a frequency substantially locked to the frequency of the interference signal, in many instances the frequency of the interference signal, in many instances the frequency of the interference signal will be sufficiently stable for the transmitted signal to be generated at a preselected frequency. Moreover, while the discussion deals primarily with 60 cycles per second interference, in some areas the interference may be of a different frequency, such as 50 cycles per second.

Assuming that the interference signal is 60 cycles per second, it is apparent that a bit frequency of 60 cycles per second or any multiple of 60 cycles per second could be used. However, because frequencies in the range of approximately 10 to 120 cycles per second are most useful in seismic exploration, bit frequencies in the range of 30 to 60 cycles per second will probably be most useful.

As the null component in the transmitted signal power spectrum varies from the frequency of the interference signal, the effectiveness of this invention in removing effects of the interference signal from seismic records will diminish. As the null frequency approaches a variation from the frequency of the interference signal of $$\frac{1}{2^n - 1}$$

times the bit frequency, the filtering effect will be lost. Useful results will normally be obtained if the null component of the transmitted signal is at a frequency within $$\pm \frac{1}{2} \left( \frac{1}{2^n - 1} \right)$$

times the frequency of the interference signal. In other words, useful results will normally be obtained if the frequency of the monochromatic interference frequency is closer to the frequency of the substantially null component than to the frequency of the components in the power spectrum of the transmitted signal adjacent the substantially null component.

I claim:
1. In a continuous wave method of seismic prospecting wherein a seismic signal is transmitted into the earth from a first location and reflections of the signal from the subsurface are thereafter detected at a second location and cross-correlated with the transmitted signal, the method of reducing the effect of a monochromatic interference signal on the signal resulting from the cross-correlation which comprises:
    transmitting a seismic signal having a power spectrum containing a substantially null component therein at a frequency nearer to the interference signal frequency than either of the frequencies of the components in said power spectrum adjacent said substantially null component are to said interference signal frequency.

2. The method of claim 1 wherein said transmitted seismic signal is a binary coded sine wave having a first phase during ONE bit intervals and the opposite phase during ZERO bit intervals, and said binary coded sine wave does not repeat for a length of time at least as long as the longest travel time of said seismic signal from the transmitting location to the deepest subsurface location of interest and back to the detecting location.

3. The method of claim 2 wherin said transmitted seismic signal is a binary coded sine wave of maximal length wherein any sequency of $n$ bits does not repeat during any sequence of $2^n-1$ bits.

4. The method of claim 2 wherein said transmitted seismic signal has a bit frequency at substantially the frequency of the interference signal and the relative magnitude of the seismic energy transmitted during the ONE and ZERO bit intervals is adjusted so that the total seismic energy transmitted during ONE bit intervals is substantially equal to the total seismic energy transmitted during ZERO bit intervals.

5. The method of claim 2 wherein said transmitted seismic signal has a bit frequency substantially equal to $1/m$ times the frequency of the interference signal where $m$ is a whole number greater than one.

6. The method of claim 4 wherein the frequency of said interference signal is sixty cycles per second.

7. The method of claim 5 wherein the frequency of said interference signal is sixty cycles per second.

8. In a continuous wave method of seismic prospecting wherein a seismic signal is transmitted into the earth from a first location and reflections of said transmitted signal from the subsurface are detected at a second loction and cross-correlated with the transmitted signal, the method of reducing the effect of a monochromatic interference signal present in the area at which seismic prospecting is conducted on seismic data records resulting from said cross-correlation comprising:

transmitting a seismic signal having a power spectrum containing a substantially null component therein at a frequency nearer to the interference signal frequency than either of the frequencies of the components in said power spectrum adjacent said substantially null component are to said interference signal frequency.

9. The method of claim 8 wherein said transmitted seismic signal is a binary coded sine wave having a first phase during ONE bit intervals and the opposite phase during ZERO bit intervals, and said binary coded sine wave does not repeat for a length of time at least as long as the longest travel time of said seismic signal from the transmitting location to the deepest subsurface location of interest and back to the detecting location.

10. The method of claim 9 wherein said transmitted seismic signal is a binary coded sine wave of maximal length wherein any sequence of $n$ bits does not repeat during any sequence of $2^n - 1$ bits.

11. The method of claim 10 wherein said transmitted seismic signal has a bit frequency at substantially the frequency of the interference signal and the relative magnitude of the seismic energy transmitted during the ONE and ZERO bit intervals is adjusted so that the total seismic energy transmitted during ONE bit intervals is substantially equal to the total seismic energy transmitted during ZERO bit intervals.

12. The method of claim 10 wherein said transmitted seismic ignal has a bit frequency substantially equal to $1/m$ times the frequency of the interference signal, where $m$ is a whole number greater than one.

13. In a system for seismic prospecting wherein a vibrator is utilized to transmit a continuous wave of seismic energy response to an electrical input control signal into the earth from a first location and reflections of the signal from the subsurface are thereafter detected at a second location and cross-correlated with the transmitted signal, the method of reducing the effects on the signal resulting from the cross-correlation of a monochromatic interference signal present in the area in which seismic prospecting is conducted comprising:

generating said input control singal in the form of a binary coded sine wave having a substantially null component in the power spectrum thereof;
detecting said interference signal present in the area in which seismic prospecting is conducted;
generating a clock signal at the frequency of said interference signal;
contolling the frequency of said binary coded sine wave with said clock signal so that said null component is substantially at the frequency of said interference signal.

14. The method of claim 13 wherein said transmitted seismic signal is a binary coded sine wave having a first phase during ONE bit intervals and the opposite phase during ZERO bit intervals, and said binary coded sine wave does not repeat for a length of time at least as long as the longest travel time of said seismic signal from the transmitting location to the deepest subsurface location of interest and back to the detecting location.

15. The method of claim 14 wherein said transmitted seismic signal is a binary coded sine wave of maximal length wherein any sequence of $n$ bits does not repeat during any sequence of $2^n - 1$ bits.

16. The method of claim 15 wherein said transmitted seismic signal has a bit frequency at substantially the frequency of the interference signal and the relative magnitude of the seismic energy transmitted during the ONE and ZERO bit intervals is adjusted so that the total seismic energy transmitted during ONE bit intervals is substantially equal to the total seismic energy transmitted during ZERO bit intervals.

17. The method of claim 15 wherein said transmitted seismic signal has a bit frequency substantially equal to $1/m$ times the frequency of the interference signal, where $m$ is a whole number greater than one.

18. The method of claim 16 wherein the frequency of said interference signal is sixty cycles per second.

19. The method of claim 17 wherein the frequency of said interference signal is sixty cycles per second.

20. In a system for seismic prospecting wherein a vibrator is utilized to transmit a continuous wave of seismic energy in rsponse to an electrical input control signal into the earth from a first location and reflections of the signal from the subsurface are thereafter detected at a second location and cross-correlated with the transmitted signal, the method of reducing the effects on seismic data records resulting from said cross-correlation of a monochromatic interference signal present in the area in which seismic prospecting is conducted comprising:

generating said input control signal in the form of a binary coded sine wave having a substantially null component within the power spectrum thereof at the frequency of said interference signal.

21. The method of claim 20 wherein said transmitted seismic signal is a binary coded sine wave having a first phase during ONE bit intervals and the opposite phase during ZERO bit intervals, and said binary coded sine wave does not repeat for a length of time at least as long as the longest travel time of said seismic signal from the transmitting location to the deepest subsurface location of interest and back to the detecting location.

22. The method of claim 21 wherein said transmitted signal is a binary coded sine wave of maximal length wherein any sequence of $n$ bits does not repeat during any sequence of $2^n - 1$ bits.

23. The method of claim 21 wherein said transmitted seismic signal has a bit frequency at substantially the frequency of the interference signal and the relative magnitude of the seismic energy transmitted during the ONE and ZERO bit intervals is adjusted so that the total seismic energy transmitted during ONE bit intervals is substantially equal to the total seismic energy transmitted during ZERO bit intervals.

24. The method of claim 21 wherein said transmitted seismic signal has a bit frequency substantially equal to $1/m$ times the frequency of the interference signal, where $m$ is a whole number greater than one.

25. In a continuous wave method of seismic prospecting wherein a seismic signal is transmitted into the earth from a first location and reflections of the signal from the subsurface are thereafter detected at a second location and cross-correlated with the transmitted signal, the method of reducing the effect of a monochromatic interference signal on the signal resulting from the cross-correlation which comprises:

transmitting a seismic signal having a power spectrum containing a substantially null component therein at the frequency of the interference signal.

26. In a continuous wave method of seismic prospecting wherein a seismic signal is transmitted into the earth and reflections of the signal from the subsurface are thereafter detected and cross-correlated with the transmitted signal, the method of reducing the effect of a sixty cycle per second interference signal on data records resulting from said cross-correlations comprising:

transmitting a seismic signal having a power spectrum containing a substantially null component therein at a frequency nearer to sixty cycles per second than either of the frequencies of the components in said power spectrum adjacent said substantially null component are to sixty cycles per second.

* * * * *